US012718285B2

(12) United States Patent
Sayadeh et al.

(10) Patent No.: US 12,718,285 B2
(45) Date of Patent: Aug. 25, 2026

(54) METHODS TO PROMOTE BIDDER PARTICIPATION

(71) Applicant: Insomniac Holdings LLC, Calabasas, CA (US)

(72) Inventors: Camill Sayadeh, Encino, CA (US); Ari Schindler, Woodland Hills, CA (US)

(73) Assignee: INSOMNIAC HOLDINGS LLC, Calabasas, CA (US)

( * ) Notice: Subject to any disclaimer, the term of this patent is extended or adjusted under 35 U.S.C. 154(b) by 728 days.

(21) Appl. No.: 17/843,842

(22) Filed: Jun. 17, 2022

(65) Prior Publication Data

US 2022/0405835 A1 Dec. 22, 2022

Related U.S. Application Data

(60) Provisional application No. 63/212,276, filed on Jun. 18, 2021.

(51) Int. Cl.
*G06Q 30/08* (2012.01)

(52) U.S. Cl.
CPC .................................... *G06Q 30/08* (2013.01)

(58) Field of Classification Search
CPC .... G06Q 30/0275; G06Q 30/08; G06Q 40/04; G06Q 30/0201–0202; G06Q 30/0242; G06Q 30/0251; G06Q 30/0253; G06Q 30/0255; G06Q 30/0269; G06V 40/16; G06V 40/174–176; G06V 40/179
See application file for complete search history.

(56) References Cited

U.S. PATENT DOCUMENTS 8,600,830 B2 12/2013 Hoffberg
2008/0235126 A1 * 9/2008 Dueck .................... G06Q 40/04 705/37
2013/0191235 A1 * 7/2013 Montero-Mask ...... G06Q 50/01 705/26.3
2021/0049627 A1 * 2/2021 Romagnolo ....... G06Q 30/0203

FOREIGN PATENT DOCUMENTS

KR 10-2010-0118160 A 11/2010

OTHER PUBLICATIONS

Luo, Tie, Sustainable Incentives for Mobile Crowdsensing: Auctions, Lotteries, and Trust and Reputation Systems (Year: 2017).*
International Search Report and Written Opinion mailed Oct. 12, 2022, Patent Application No. PCT/US2022/034116, 9 pages.

* cited by examiner

*Primary Examiner* — Victoria E. Frunzi
*Assistant Examiner* — Timothy J Kang
(74) *Attorney, Agent, or Firm* — Davis Wright Tremaine LLP

(57) ABSTRACT

A computer-implemented method to promote bidder participation. A bid is received from a client for an auction, the bid is published, and weighted relative to other bids in the auction. The bid is rewarded with a share of the winning bid.

9 Claims, 7 Drawing Sheets

METHODS TO PROMOTE BIDDER PARTICIPATION

CROSS-REFERENCE TO RELATED APPLICATIONS

This application is a non-provisional of and claims the benefit of U.S. Provisional Application No. 63/212,276, filed Jun. 18, 2021, entitled "A Mechanism for Auctions that Pay Out Not Just Sellers and Agents, but Bidders as Well.". This application is hereby incorporated herein by reference in its entirety and for all purposes.

BACKGROUND

Auctions provide a vital marketplace for the sale of items. Auctions too often receive too few bids on items because there is little incentive for potential buyers to continue to bid when multiple bidders are involved. Those active bidders who do not win the auction primarily provide benefits to the ultimate auction seller.

BRIEF DESCRIPTION OF THE DRAWINGS

Various techniques will be described with reference to the drawings, in which.

DETAILED DESCRIPTION

Figure 1:
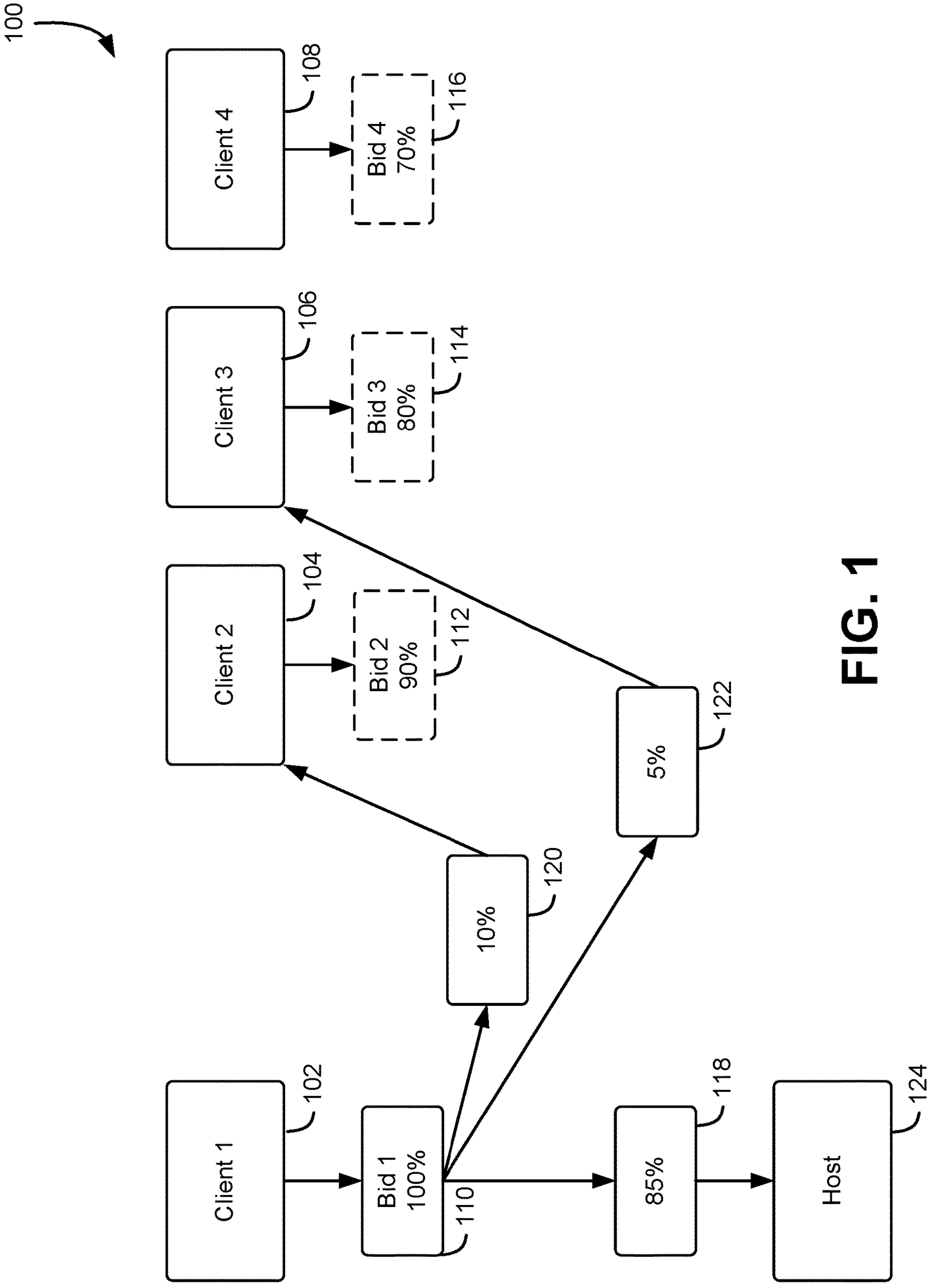
FIG. 1 is a block diagram depicting an embodiment of a percentage-based reward system for client participation.

Auctions provide a vital marketplace for the sale of items. Auctions often receive few bids on items because there is little incentive for potential clients to continue to bid when multiple clients are involved. Active clients who do not win a traditional auction simply provide benefits to the ultimate auction seller. The techniques herein solve this problem to promote bidding participation and activity.

Techniques described and suggested herein include methods, systems and processes to enable a holistic auction experience for participating bidders. In one example, an auction process is presented with a more holistic auction marketplace than previous models by allowing the parties who have contributed most to the final auction price to realize a benefit from the auction. In at least one embodiment, techniques described and suggested herein allow for multiple bidders from the auction to realize a benefit from the auction.

Techniques described herein allow one or more client who are unsuccessful placing the winning bid to realize a benefit for contributing to the increase of the highest bid for the auction host.

Existing auction models are problematic because they disincentivize participation because there is simply a single winner and a single seller who realize the benefit of the highest bid. The techniques presented differ from what currently exists. The techniques presented allow additional parties who have contributed to bidding up the highest bid to realize a benefit.

The techniques presented allow for multiple bidders from an auction to realize a benefit from the auction. By logging bidding activity and determining relative bidding behavior, one or more clients who did not place the highest bid are rewarded for participation in the auction.

An auction is created and configured to accept one or more bids from multiple clients. Clients may be potential buyers, bidders, voters, proposers, or the like. Client bids may be for a value, such as monetary or quantity of resources. Resources may be rooted in computer technology, such as memory, storage, processing capacity (e.g., number of virtual machine, cores or threads; clock speed), or networking capability (e.g., networking speed or access to network ports). Resources may be related to an auction process, for example, credits to participate in an auction. Credits may be monetary, or may be used by a client to place a bid. An auction may be for sponsoring a keyword search result as found within the context internet-based search engines. For example, the auction may be a sponsored search auction (SSA), also known as a keyword auction, in reference to results from a search engine that are part of sponsored advertisements by a host or third parties.

When creating and/or configuring an auction, a host or seller may determine the bidding format for the auction, defining who may bid, what constitutes a valid bid, and how the winning bid is determined. The bidding format could define the auction as a traditional style, such as increasing-price, sealed-bid, or second-price, or as a more novel style. The format could also define means of extending the time limit of increasing-price auctions, revealing bids and initiating new rounds of sealed-bid auctions, a minimum increment in the value of bids, or other variants.

A host or seller may also determine the payout format for the auction, defining what the total payout is, and how the payout will be distributed and to which bidders beyond the ultimate winner. The payout format could define payouts for a quantity of top bidders below the winning bidder, or payouts for all bidders who bid within a given timeframe before the auction was concluded, or all bidders who bid in the a given prior bidding round before the auction was concluded, or all bidders who bid above a certain threshold, or other criteria or combination of criteria. The format could define all these ancillary payouts as a portion of the total payout, or as fees added onto the total payout.

During or after bidding, a host or monitoring system may create a log of bids by recording each bidder, what was bid in relative or absolute terms to other bids, and the timing or sequencing of the bids in relative or absolute terms to other bids.

A computing node may include a processor and store executable instructions, that when executed by the processor, cause the processor to host the auction in accordance with the bidding and payout formats, receive and validates bids, update the log of bids, determine the winning bid, determine the payouts, and conducts any other aspects of the auction. A computing node may be a virtual machine or collectively operate within a cluster of computing nodes.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: improve bidding participation among client increasing a number of clients participating in an auction and/or increasing frequency of a client bidding and/or increasing the highest bid in the auction and/or by each client participating in bidding. By rewarding participation in the auction, client experience is improved by allocating resources to one or more participating clients who did not win the auction to offset resources allocated to the auction, e.g., time, energy, or monetary budget.

Figure 2:
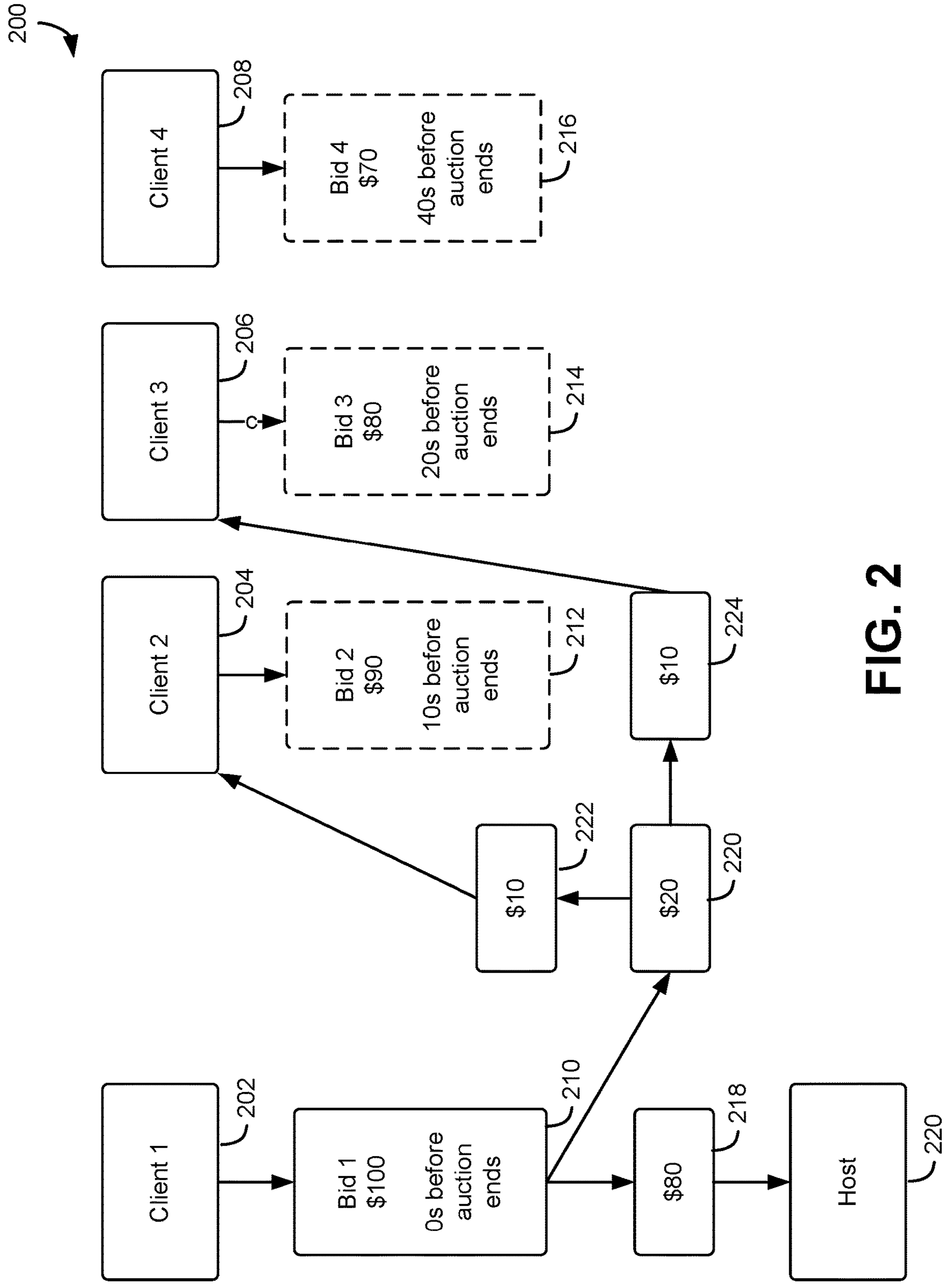
FIG. 2 is a block diagram depicting an embodiment of a value-based reward system for client participation.
Figure 3:
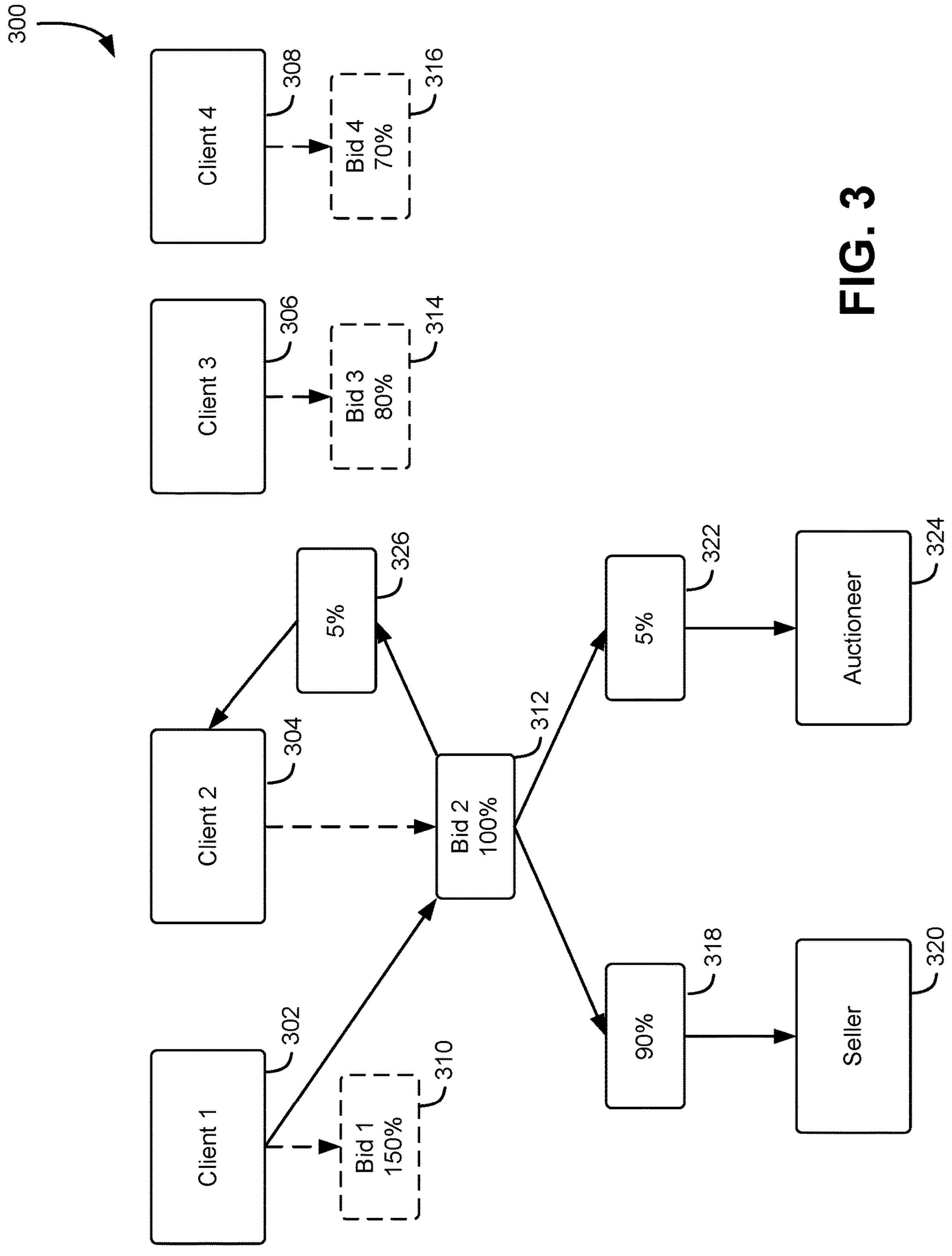
FIG. 3 is a block diagram depicting an embodiment of a percentage-based reward system for client participation using a runner-up bid as a determining bid.
Figure 4:
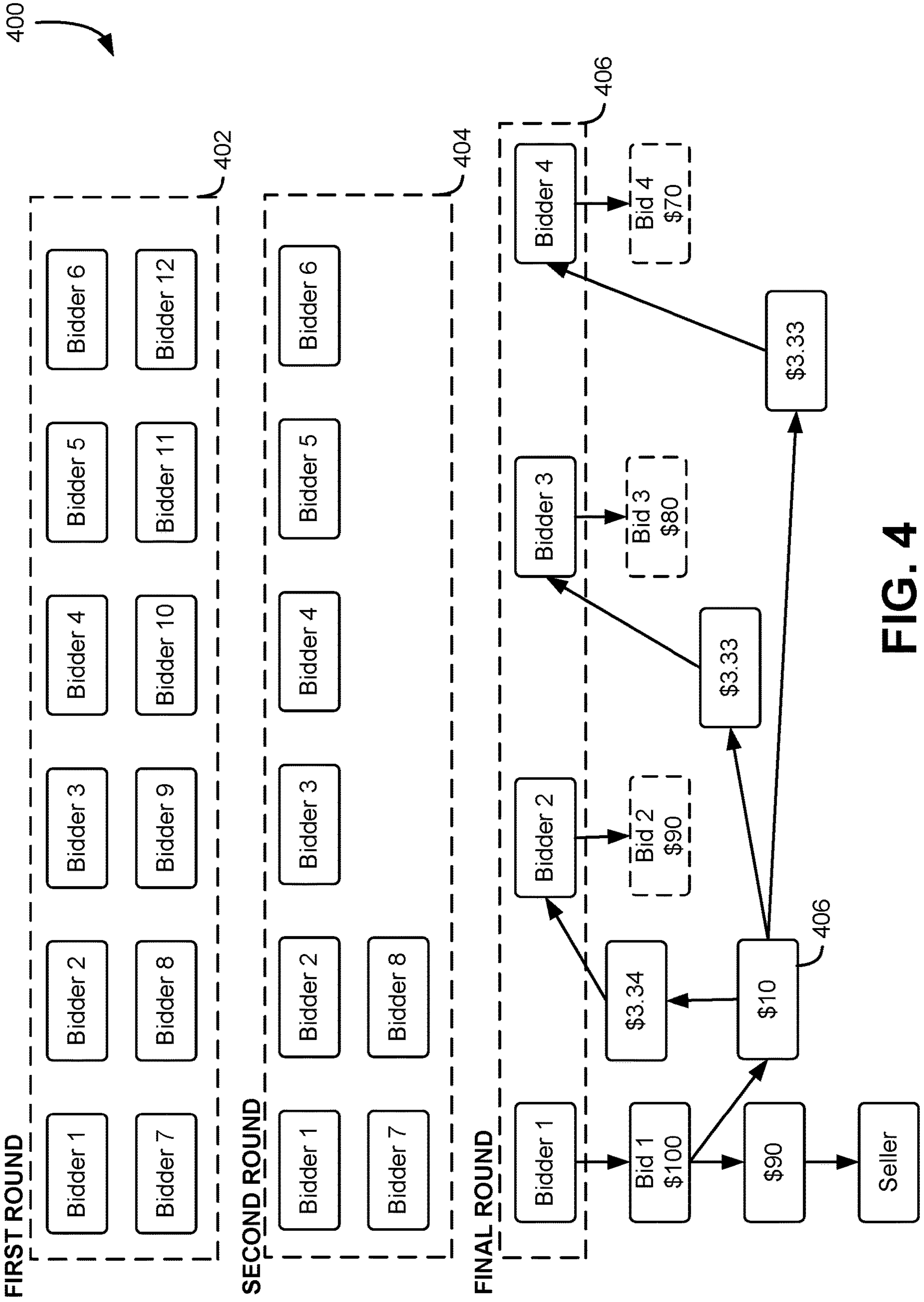
FIG. 4 is a block diagram depicting an embodiment of a value-based reward system for client participation in a sealed-bid auction environment with multiple rounds.
Figure 5:
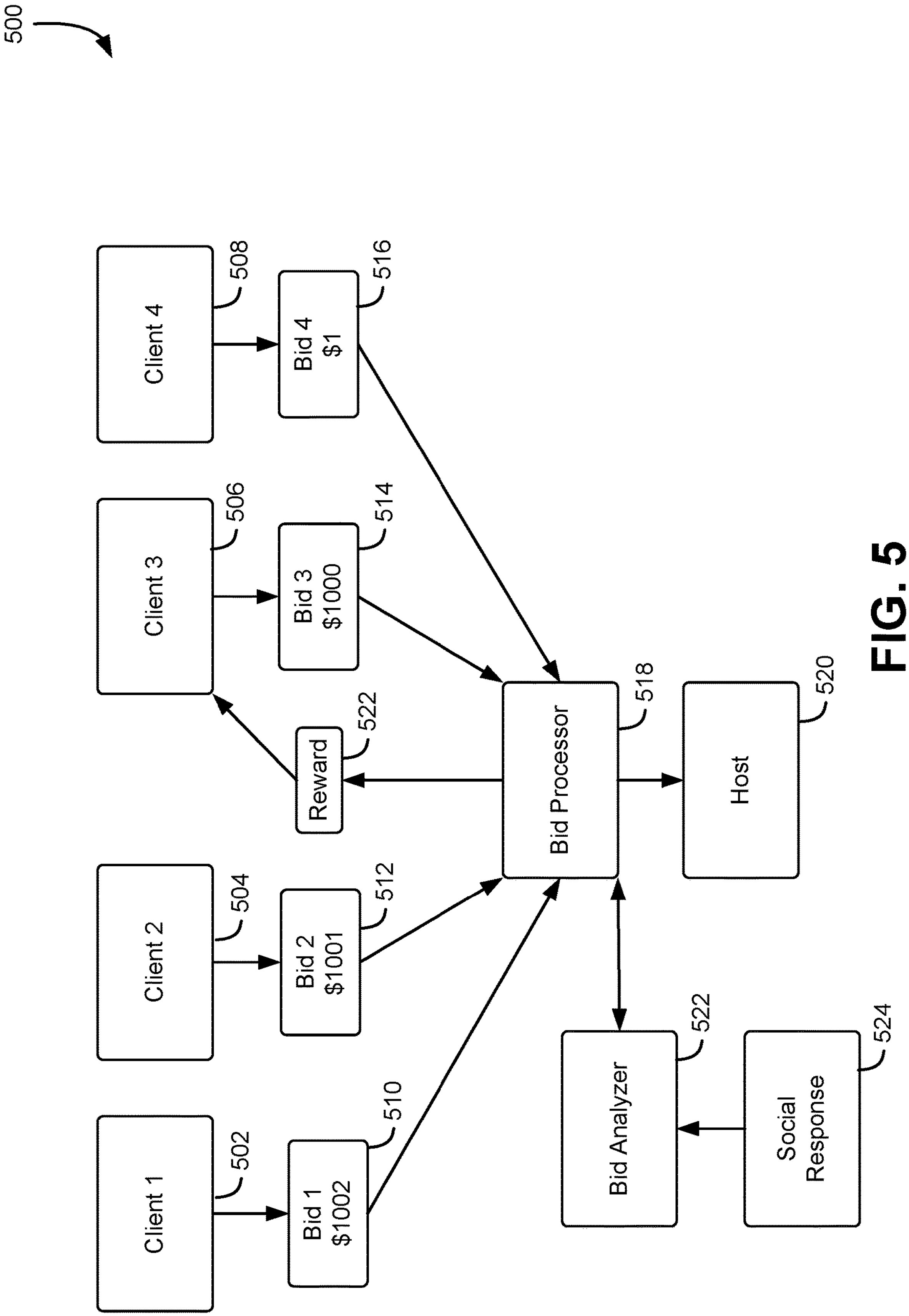
FIG. 5 is a block diagram depicting an embodiment of a reward system for client participation.
Figure 6:
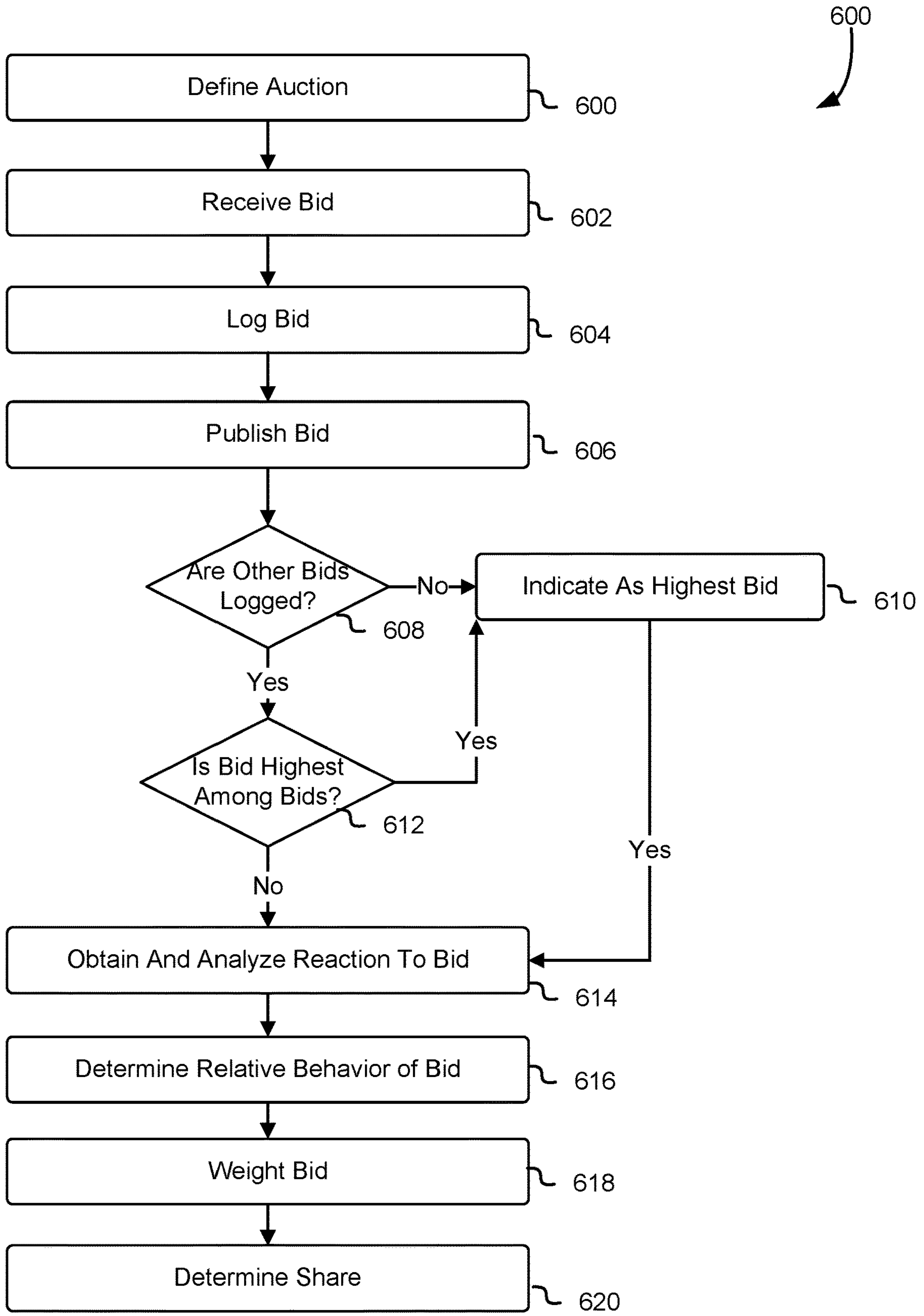
FIG. 6 is a flow chart depicting an embodiment of a reward system for client participation.
Figure 7:
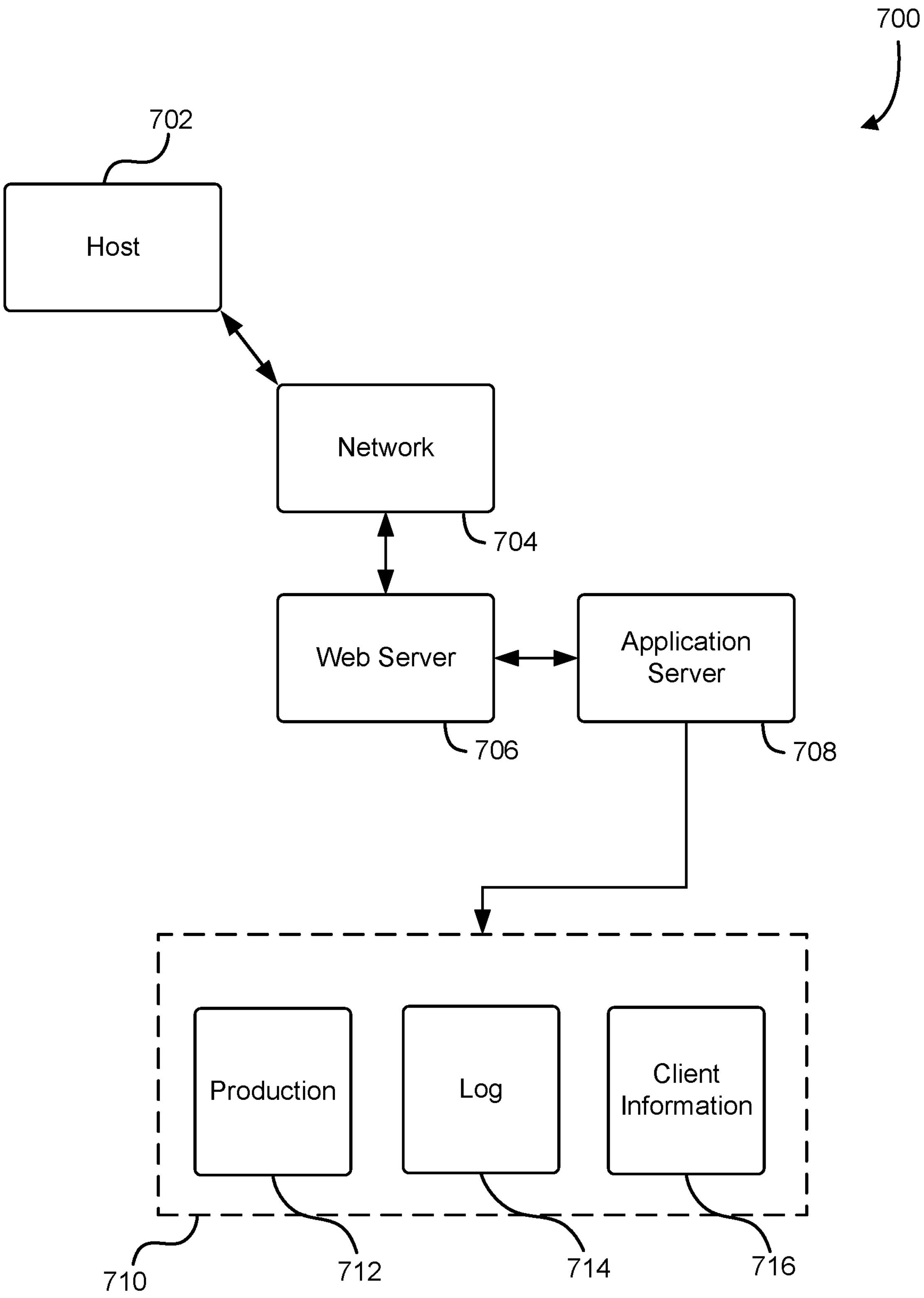
FIG. 7 illustrates a system in which various embodiments can be implemented.

FIG. 1 is a block diagram depicting an embodiment of a percentage-based reward system for client participation;

FIG. 2 is a block diagram depicting an embodiment of a value-based reward system for client participation;

FIG. 3 is a block diagram depicting an embodiment of a percentage-based reward system for client participation using a runner-up bid as a determining bid;

FIG. 4 is a block diagram depicting an embodiment of a value-based reward system for client participation in a sealed-bid auction environment with multiple rounds;

FIG. 5 is a block diagram depicting an embodiment of a reward system for client participation;

FIG. 6 is a flow chart depicting an embodiment of a reward system for client participation; and FIG. 7 illustrates aspects of an example system 700 for implementing aspects in accordance with an embodiment.

FIG. 1 is a block diagram depicting an embodiment of a percentage-based reward system 100 for client participation. While the system 100 is depicted with percentage-based rewards, fungible value-based rewards and unique rewards are considered within the scope of disclosure. The system 100 comprises a multiplicity of clients, shown as Client 1 102, Client 2 104, Client 3 106, and Client 4 108, though more or less clients comprising at least two clients are within the scope of disclosure. A client of the Clients 1-4 102-108 may also be referred to as, for example, a bidder, a buyer, a participant, or a voter. A client may be an individual person, wherein the person places a bid via an application programming interface (API) call on a device associated with the individual person. The device of the person may be a personal computing device, personal mobile device, or a public kiosk accessible to the individual from which an API call may be sent over a network to a host of the auction, e.g., Host 124.

In an embodiment, Clients 1-4 102-108 place corresponding bids, shown as Bid 1 110, Bid 2 112, Bid 3 114, and Bid 4 116, respectively. An auction may be defined or configured such that a processor may limit a given client to a single bid throughout the auction or individual rounds of an auction, or may enable a client to place multiple bids with alternative restrictions, or place bids without restriction. A bid may cause the auction current price to immediately reflect the value of the bid, or may be representative of a maximum bid for the Host 124 to apply according to bid increments defined by the auction.

In an embodiment, Client 1 102 places Bid 1 110 that is the highest bid of all bids placed by the participating clients. Bid 1 110 as the highest bid represents 100% of the total value that may be conveyed to the Host 124 of the auction. In this embodiment, Client 2 104 placed Bid 2 representative of 90% of the highest bid, Client 3 106 placed Bid 3 114 representative of 80% of the highest bid, and Client 4 108 placed Bid 4 116 representative of 70% of the highest bid. Intervals of 10% of the highest bid are for illustrative purposes, while any percentage is contemplated as within the scope of disclosure.

In an embodiment, the Host 124 receives a share of the final bid, here representative of the highest bid Bid 1 110. The share 118 is illustrated as 85% of the highest bid. In an embodiment, the share allocated to the Host 124 may be any percentage. The Host 124 may be a seller of an item or service or an intermediary agent for the seller of the item or service.

In an embodiment, to reward participation in the auction of System 100, Client 2 104 with 90% of the highest bid, Bid 2 112, receives a share of the final bid. The Host 124 may determine the share amount for the second highest bid, such as by a percentage of the highest bid, a percentage of the difference between two or more bids, e.g., between Bid 1 110 and Bid 2 112 or between Bid 2 112 and Bid 3 114, an acceleration in the difference in bids, e.g., a rate in change of the difference between a series of bids, based on the placement of the bid within a sequence of bids, based on the timing of the bid relative to the auction beginning, auction end, or previous bid, according to a defined value by the auction, Host 124, or beneficiary of the auction, such as a seller or agent of the seller of an item or service listed in the auction, or a combination thereof.

In an embodiment, two or more clients may receive rewards for participating in the auction. For example, Client 3 106 may receive a share of the highest bid for placing a bid that contributed to the highest bid, such as share 112 representative of 5% of the highest bid. In an embodiment, Share 112 is less than Share 120 as a result of Share 122 being of a lower bid value, of being placed earlier in the sequence of bids, of being placed further from the auction ending or closer to the auction beginning, being of a lower difference in value relative to a preceding bid than the difference between Bid 2 112 and Bid 3 114, due to a slower acceleration of bid value relative to preceding bid increases, according to a defined value by the auction, Host 124, or beneficiary of the auction, such as a seller or agent of the seller of an item or service listed in the auction, or a combination thereof. Alternatively, Share 122 may be of a greater resource value than Share 120 for reasons similar to the reasons Share 112 may be less than Share 122. Share 120 and Share 122 may be equal in some embodiments for some of the reasons provided above.

In an embodiment, a Share 120 and/or Share 122 may be a resource related to an auction process. For example, a resource may be a credit to participate in an auction. Credits may be monetary. A credit may be used by a client to place a bid. For example, one or more credits may be required by an auction process for a client to place a bid. A credit may be applied towards a value of a bid. A credit may grant a client one or more permissions related to an auction, for example, to place a bid at a particular difference above a current bid value, to place a bid at a particular time relative to the auction beginning, auction ending, or relative to when other bids are or have been placed.

In some embodiments, Client 3 106 and Client 4 108 do not receive a share of the highest bid. Not receiving a share may be the result of not adequately contributing to the auction, for example, only the runner-up client receives a share, e.g. Client 2 104, and/or second runner-up client, e.g., Client 3 106. Additional runner-up clients may be considered for a reward share of the highest bid. Client 3 106 and Client 4 108 may not receive a share of the highest bid due to not bidding a value of a sufficient difference in value from preceding bids, not bidding with sufficient acceleration relative to preceding bids, bidding too early or too late, according to a policy by the auction, Host 124, or beneficiary of the auction, such as a seller or agent of the seller of an item or service listed in the auction, or a combination thereof.

FIG. 2 is a block diagram depicting an embodiment of a value-based reward system 200 for client participation. System 200 may share features of System 100 described above. For example, Client 1 202 may be the same or similar to Client 1 102, Client 2 204 may be the same or similar to Client 2 104, Client 3 206 may be the same or similar to Client 3 106, and Client 4 208 may be the same or similar to Client 4 108. Bid 1 210, Bid 2 212, Bid 3 214, and Bid 4 216 may be placed by corresponding Client 1 202, Client 2 204, Client 3 206, and Client 4 208.

In an embodiment, highest bid 210 results in a Share 218 being allocated to the Host 220. Host 220 may share similar or the same attributes as Host 124 described above regarding FIG. 1. Bid 1 210 is illustrated as being placed as the auction ends. According to a share defining policy, Share 220 may be determined based upon a percentage of the difference between two or more bids, an acceleration in the difference in bids, e.g., a rate in change of the difference between a series of bids, based on the placement of the bid within a sequence of bids, based on the timing of the bid relative to the auction beginning, auction end, or previous bid, according to a defined value by the auction, Host 220, or beneficiary of the auction, such as a seller or agent of the seller of an item or service listed in the auction, or a combination thereof.

For example, bids placed within a time limit of the auction ending may be eligible for a share of the highest bid. Bids within a threshold value or percentage of the highest bid may be eligible for a share of the highest bid. Bids that occurred within a threshold time limit of another bid or series of bids may be eligible for a share of the highest bid.

In an embodiment, Share 220 is defined by the Host 220 and split into Subshares 222 and 224. Subshares may be determined in the same or similar manner as shares described above and/or in regard to Share 120 and Share 122 described in FIG. 1. Depending on the formats chosen to construct the auction, a processor may need to leverage if-then relationships throughout the process of analyzing the bidding behavior. For instance, if the processor determines that the reward format delivers 5% of the total split evenly between all clients who bid in the last threshold time limit of an auction, there are only going to be rewards for clients if other clients besides the client with the highest bid places a bid in the last threshold time.

In an embodiment, Client 3 206 and Client 4 208 are not be eligible for a share of the highest bid. Client 3 206 and Client 4 208 may not be eligible as a result of not meeting the criteria described above regarding Share 220 and/or in regard to Share 120 and Share 122 described in FIG. 1.

FIG. 3 is a block diagram depicting an embodiment of a percentage-based reward system 300 for client participation using a runner-up bid as a determining bid. A runner-up bid may be part of a generalized second-price auction. Examples of second-prize auctions include generic truthful mechanisms for achieving a socially-optimal solution, such as the Edelman, Ostrovsky, Schwarz, Varian, and Vickrey-Clarke-Groves auction models. The auction mechanism may utilize sealed or unsealed, i.e., secret or published, bidding.

System 300 may share features of System 100 and/or System 200 described above. For example, Client 1 302 may be the same or similar to Client 1 102, Client 2 304 may be the same or similar to Client 2 104, Client 3 306 may be the same or similar to Client 3 106, and Client 4 308 may be the same or similar to Client 4 108. Bid 1 310, Bid 2 312, Bid 3 314, and Bid 4 316 may be placed by corresponding Client 1 302, Client 2 304, Client 3 306, and Client 4 308.

In an embodiment, System 300 utilizes a secret or sealed second-prize auction mechanism by which Client 1 302, Client 2 304, Client 3 306, and Client 4 308 places bids Bid 1 310, Bid 2 312, Bid 3 314, and Bid 4 316. As Client 1 302 placed the highest bid 310, Client 1 as the winner is ultimately assigned the runner-up Bid 2 312.

Shares of the highest bid may be allocated similar to share allocations describes regarding FIGS. 1-2 described above. For example, 90% of the highest bid is allocated via Share 318 to Seller 320. Seller 320 may share similar or same features of Host 124 and/or Host 220. For example, Seller 320 may be the entity selling an item or service, including a sponsored keyword search, and/or may then host the keyword search results defined by the highest bidder, Client 1 302. A Share 322 may be allocated to the entity hosting the auction, for example, Auctioneer 324. In an embodiment, Auctioneer 324 may share similar or same features of Host 124 and/or Host 220. For example, Auctioneer 324 hosts the auction mechanism by which Client 1 302, Client 2 304, Client 3 306, and Client 4 308 participate in System 300.

In an embodiment, additional shares may be allocated to one or more runner-up bids. For example, Share 326 of the highest bid may be allocated to Client 2 304 in consideration for placing the second-prize auction bid. Share 326 and/or additional shares allocated to clients may be allocated similarly to Shares 120 or 122 described above regarding FIG. 1 and/or Shares 220, 222, or 224 described above regarding FIG. 2.

FIG. 4 is a block diagram depicting an embodiment of a value-based reward System 400 for client participation in a sealed-bid auction environment with multiple rounds. System 400 may share features of System 100 and/or System 200 and/or System 300 described above.

In an embodiment, the bidders with the highest value bids from a First Round 402 advance to a Second Round 404. Subsequent bidding rounds are contemplated within the scope of disclosure. Each bid from a respective bidder may be sealed or maintained as a secret. In an embodiment, the bids that constitute the highest bids that are allowed to proceed to the subsequent round of bidding may each be published, a range of values representative of the bidding spread, an average value, or a value representative of the difference between one or more bid values.

In an embodiment, the bidders from the Final Round 406 are eligible for a share of the highest bid. Bidders 2, 3, and 4 of the Final Round 406 may be allocated a portion of a Share 408. Share 408 and/or subshares of Share 408 may be determined in the same or similar manner as Shares 120 or 122 described above regarding FIG. 1 and/or Shares 220, 222, or 224 described above regarding FIG. 2 and/or Share described above regarding FIG. 3. In an embodiment, Share 408 is distributed substantially equally among the bidders of the Final Round 406. A residual share value resulting from a remainder of division among selected bidders of the Final Round 406 may be allocated to one of the selected bidders or revert to the seller or host of the auction.

FIG. 5 is a block diagram depicting an embodiment of a reward system 500 for client participation. System 500 may share features of System 100 and/or System 200 and/or System 300 and/or System 400 described above. While the System 500 is depicted with monetary-based rewards, percent value-based rewards and unique rewards are considered within the scope of disclosure.

In an embodiment, System 500 comprises a multiplicity of clients, shown as Client 1 502, Client 2 504, Client 3 506, and Client 4 508, though more or less clients comprising at least two clients are within the scope of disclosure. A client may also be referred to as, for example, a bidder, a buyer, a participant, or a voter. Clients 1-4 502-508 may share same or similar features with Clients 1-4 described above in relation to FIGS. 1-4. A client may be an individual person, wherein the person places a bid via an API call on a device associated with the individual person. The client may be a computing node, mobile device, or virtual machine from which an API call may be sent over a network to a bid processor and/or host of the auction, e.g., Bid Processor 518 and/or Host 520, respectively.

In an embodiment, Clients 1-4 502-508 place corresponding bids, shown as Bid 1 510, Bid 2 512, Bid 3 514, and Bid 4 516, respectively. An auction may be defined or configured such that a processor may limit a given client to a single bid throughout the auction or individual rounds of an auction, or may enable a client to place multiple bids with alternative restrictions, or place bids without restriction. A bid may cause the auction current price to immediately reflect the value of the bid provided the bid is the highest value bid thus received, or may be representative of a maximum bid to apply according to bid increments defined by an auction parameter. An auction parameter may be defined or configured by the Host 520.

In an embodiment, Bid Processor 518 receives Bids 1-4 510-516. Bid Processor 518 may publish the bids. Bid Processor 518 may publish the bids to a video, news feed, social networking platform, or other stream for an audience to observe. Such stream may be an internet-based live stream presentation with interaction capability from an audience. Bids 1-4 510-516 may be published in approximately real-time, after a set delay, or according to an internal or schedule.

In an embodiment, Bid Analyzer 522 logs Bids 1-4 510-516. Bid Processor 518 may publish the bids utilizing Bid Analyzer 522. Bid Analyzer 522 may include machine learning capability to associate bidding activity with an emotional scaling of an audience observing and reacting to the bid. For example, Bid Analyzer 522 may be trained with various facial expressions indicative of reactions, for example, surprise, excitement, awe, ambivalence, boredom, and/or rating levels thereof. Bid Analyzer 522 may track facial expressions of an individual's face obtained from Social Response 524 when a bid amount is published to be observed by the individual and associate such facial expressions of the individual reactions to observing the bid with an emotion and/or rating of the emotion.

Social Response 524 may be triggered to be obtained as an application publishes the bid to an individual. For example, an individual accessing a stream on their mobile device causes a camera on the mobile device to record the individual or records text or emoji messages transmitted by the individual as a reaction to accessing the stream. Social Response 524 may include picture or video recordings of an individual obtained from a camera. For example, data received from Social Response 524 indicative of an individual displaying a smile and open mouth may be rated by Bid Analyzer 522 with a higher rating than an individual displaying simply a smile with closed mouth. Bid Analyzer 522 may be trained to associate a given facial expression with an emotion based on a set of training images of various individuals emoting at various labeled emotions and each labeled emotion at various levels of intensity. Bid Analyzer 522 may be trained to associate text and/or emojis with emotional responses and/or scaling thereof based on a set of labeled training text and/or emoji messages indicating various emotions and levels thereof. Social Response 524 may include text or emoji messages associated with an individual reacting to a bid. For example, data received from Social Response 524 indicative of an emoji of a smiley face and sunglasses may be rated by Bid Analyzer 522 with a higher scaling than a simple smiley face. Bid Analyzer 522 may track relative volume of a data stream indicative of Social Response 524 associated with bidding activity, such as social behavior with time stamps that correspond to timing of particular bids. Social Response 524 may be obtained within a threshold time of a bid being placed, within a threshold time of a bid being published to an individual, within a threshold time of the respective auction ending, or other times set by an auction parameter.

In an embodiment, a Reward 522 is allocated to Client 3 506 by Bid Processor 518 based at least in part on a reaction obtained from Bid Analyzer 522. For example, Bid Analyzer 522 may have obtained pictures, video, or data indicative of one or more individuals who produced the most emotive response to Bid 514 when, for example, the bid value changed from 1 to 1000. Emotive responses obtained as a result of Bids 510 and 512 may be relatively lower than emotive responses obtained as a result of Bid 514 and as such would be rated lower by Bid Analyzer 522.

In an embodiment, Reward 522 may be determined based at least in part on the relative behavior of a bid. For example, Bid Analyzer 522 may determine a weighting of Reward 522 in a shared or similar manner as share amounts are determined above. Bid Analyzer 522 may determine Reward 522 based on a percentage of the highest bid, a percentage of the difference between two or more bids, e.g., between Bid 1 510 and Bid 3 516 or between Bid 3 516 and Bid 4 518, an acceleration in the difference in bids, e.g., a rate in change of the difference between a series of bids, based on the placement of the bid within a sequence of bids, based on the timing of the bid relative to the auction beginning, auction end, or previous bid, according to a defined value by the auction, Host 520, or beneficiary of the auction, such as a seller or agent of the seller of an item or service listed in the auction, or a combination thereof. Relative behavior of a bid may be determined in context of all bids being submitted to a machine learning algorithm that may process bids collectively and weight a given bid relative to a set of other bids.

FIG. 6 is a flow chart depicting an embodiment of a reward system 600 for client participation. System 600 may incorporate features of Systems 100, 200, 300, 400, or 500. A host may define parameters of an auction 600. A host may specify the item or service to be auctioned, details of the item or service, one or more bidding mechanisms, and/or an exchange by which a winning client bidder may transfer value to the host in consideration for the item or service. A parameter of an auction may include the auction type, for example whether first-prize (such as described in relation to FIGS. 1-2), second-prize (such as described in relation to FIG. 3), or round based (such as described in relation to FIG. 4). Parameters may also include duration of the auction, bidding frequency, extensions of time as a result of bidding (such as to extend the time when a bid is placed near the auction end), reductions of time as a result of low bidding participation, minimum bid increments, sealed or unsealed bidding, etc.

A host or auctioneer may receive a bid 602 directly, or with a bid processor or bid analyzer as a subsystem, agent, or intermediary of the host as described above regarding FIG. 5. The host or intermediary thereof may receive a bid 602 via an API call sent from a client to the host or intermediary thereof. The API call may include a request to place a bid, data identifying the client, data authenticating the request, and/or data to comply with one or more policies or parameters of the auction. Once the request is authenticated, such as by decrypting the request using symmetric or asymmetric cryptographic operations, the host or intermediary thereof, such as a bid processor as described in FIG. 5, may log the bid 604.

The host or intermediary thereof may then publish the bid 606. Publishing a bid 606 may be to clients participating in the bidding, to clients enrolled or authorized to participate in bidding, and/or to an audience. Publishing a bid 606 may be via a social networking platform where details of the bidding are live streamed to one or more viewers.

A host or subsystem thereof, such as a bid processor as described in FIG. 5, may determine whether other bids are logged 608. If no other bids are logged, the given bid is indicated as the highest bid 610. If other bids are logged, the given bid is determined whether it is the highest among other bids 612. If the given bid is the highest, the host or subsystem thereof indicates the given bid as the highest 610.

A host or subsystem thereof, such as a bid analyzer as described in FIG. 5, may obtain and analyze one or more reactions to a given bid 614 whether or not the given bid is the highest bid. A reaction may be physical reaction of an individual, such as a facial expression as described in FIG. 5, or other body motion of an individual association with a reaction trained to the host or subsystem thereof. A reaction may be associated with text messages or emoji characters sent from viewers via the social networking platform or similar and analyzed by the bid analyzer in association with a given bid. A bid analyzer may also obtain and analyze volume of audience participation in viewing the bidding, whether greater quantity or quality of participation would result in a higher rating being attributed to a corresponding bid during a live stream as determined by the bid analyzer.

A host or subsystem thereof, such as a bid analyzer as described in FIG. 5, may determine relative behavior of a bid, such as described in FIGS. 1-5 when determining a share. For example, relative behavior may be determined based on a percentage difference between a given bid and another bid from the auction or selected collection of auctions, an acceleration in the difference in bids, e.g., a rate in change of the difference between a series of bids, based on the placement of the bid within a sequence of bids, based on the timing of the bid relative to the auction beginning, auction end, or previous bid, according to a defined value by the auction, host, intermediary of the host, or beneficiary of the auction, such as a seller or agent of the seller of an item or service listed in the auction, or a combination thereof.

A host or subsystem thereof, such as a bid processor as described in FIG. 5, may weight the bid 618 relative to rating of the reaction to the bid 614, rating of the reaction to the 614 compared to other ratings associated with corresponding other bids, and/or determined relative behavior of the bid 616 compared to other bids. Determined relative behavior of a bid may be performed at least in part by a machine learning algorithm that considers a set of bids, including bidding behavior of other auctions. For example, a bid that is much greater, such as ten times the value of a prior bid or similar logarithmic or exponential increase over one or more previous bids, may be labeled as an influential bid and weighted proportionately higher than bids that reflect relatively minor increases in bid value. An auction parameter may adjust a weighting schema, so as to highlight selected attributes relative to the rating of one or more reactions to the bid, relative reaction rating of the bid, and/or relative bid behavior. For example, in FIG. 5 Bid 3 514 represented the single greatest difference between bids and as such greatly impacted the final bid amount proffered in Bid 1 510. Accordingly, a host or subsystem thereof, such as a bid processor as described in FIG. 5, may be trained or otherwise instructed to reward such behavior as represented by Bid 3 514. In an embodiment, weighting of a bid may be according to or influenced by a random number generator or arbitrary characteristic of a bid defined by an auction parameter.

A host or subsystem thereof, such as a bid processor as described in FIG. 5, determines a share of the selected bid, e.g., the highest bid. In some embodiments, such as when the auction is according to a second-prize auction model, selected bids is the second-prize bid. In an embodiment, when an individual is eligible for a share according to an auction parameter, one or more bids placed by the same individual are weighted together to determine the share. In an embodiment, multiple individuals who placed runner-up bids are selected as eligible for a share and one or more of their respective bids are weighted to determine each share for each individual.

FIG. 7 illustrates aspects of an example system 700 for implementing aspects in accordance with an embodiment.

As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system, such as described above regarding System 100, System 200, System 300, System 400, System 500, and System 600, includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and client information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method for increasing client engagement with an online auction service, comprising:

receiving a bid from a first client device, associated with a first user, for an auction provided by the online auction service;

publishing the bid to a live stream accessible by the first client device and one or more second client devices, the live stream including information from the auction;

causing a camera device of the one or more second user devices to record one or more images of a second user using the one or more second user devices upon detecting that the one or more second user devices has accessed the live stream;

analyzing one or more facial expressions of the second user viewing the live stream from the one or more images;

determining an emotive response associated with the one or more facial expressions and associating a rating of the one or more facial expressions relative to the bid published to the live stream;

weighting the bid relative to other bids in the auction, wherein a greater difference between the bid and other bids results in a greater weighting of the bid, and wherein the weighting is based at least in part on the determined emotive response and associated rating;

determine a winning bid different from the bid, the winning bid provided by a winning client device different from the first client device;

determine a share of a value corresponding to the winning bid, the share determined based on the weighted bid; and allocate the share to the first user associated with the first client device, wherein the share is usable within the online auction service.

2. The computer-implemented method of claim 1, wherein determining the emotive response associated with the one or more facial expressions is based on a result of a machine learning capability to associate bidding activity with an emotive scaling of the one or more facial expression, a text message, an emoji message, or a combination thereof transmitted by the one or more second user devices.

3. The computer-implemented method of claim 2, wherein the emotive scaling is based on a weighting of the one or more facial expressions, the text message, the emoji message, the combination thereof, or one or more of another facial expression, another text message, or another emoji message from another of the one or more second user devices.

4. The computer-implemented method of claim 1, wherein associating the rating of the emotive reaction is further based on a volume of audience participation in viewing the auction.

5. A computer-implemented method, comprising:

receiving, by an online auction service, a bid from a first client device, associated with a first user, for an auction;

publishing the bid to a live stream accessible by the first client device and one or more second client devices, the live stream including information from the auction;

causing a camera device of the one or more second user devices to obtain one or more images of a second user using the one or more second user devices upon detecting that the one or more second user devices has accessed the live stream;

weighting the bid relative to other bids in the auction based at least in part on the obtained one or more images of the second user;

determining a winning bid different from the bid, the winning bid provided by a winning client device different from the first client device;

determining a share of a value corresponding to the winning bid, the share determined based on the weighted bid; and allocating the share to the first user associated with the first client device.

6. The computer-implemented method of claim 5, wherein determining the share is weighted by a determined emotive response associated with one or more facial expressions of second user viewing the auction form the obtained one or more images and associating a rating of the one or more facial expressions.

7. The computer-implemented method of claim 6, wherein determining the share is weighted by a rating of determined emotive response associated with one or more obtained facial expressions from the one or more second user devices.

8. The computer-implemented method of claim 7, wherein the determined emotive response associated with the one or more facial expressions is based on a result of a machine learning capability to associate bidding activity with an emotive scaling of the one or more facial expression, a text message, an emoji message, or a combination thereof transmitted by the one or more second user devices.

9. The computer-implemented method of claim 8, wherein the emotive scaling is based on a weighting of one or more of the one or more facial expressions, the text message, the emoji message, the combination thereof, another facial expression, another text message, or another emoji message from another of the one or more second user devices.

* * * * *